United States Patent
Eldridge et al.

(10) Patent No.: US 8,995,653 B2
(45) Date of Patent: Mar. 31, 2015

(54) GENERATING A SECRET KEY FROM AN ASYMMETRIC PRIVATE KEY

(75) Inventors: Alan D. Eldridge, Hollis, NH (US); David S. Kern, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 1411 days.

(21) Appl. No.: 11/179,189

(22) Filed: Jul. 12, 2005

(65) Prior Publication Data

US 2007/0014398 A1    Jan. 18, 2007

(51) Int. Cl.
  *G06F 21/00* (2013.01)
  *G06F 21/72* (2013.01)
  *H04L 9/08* (2006.01)

(52) U.S. Cl.
  CPC .............. *G06F 21/72* (2013.01); *H04L 9/0869* (2013.01)
  USPC .............. 380/44; 380/47; 713/150; 713/182; 726/5

(58) Field of Classification Search
  CPC .................................................. H04L 9/0869
  USPC .............. 380/44, 47; 713/150, 182, 184, 185; 726/5, 6; 705/65, 67
  See application file for complete search history.

(56) References Cited

U.S. PATENT DOCUMENTS

| | | | | |
|---|---|---|---|---|
| 4,405,829 A | * | 9/1983 | Rivest et al. | 380/30 |
| 5,737,419 A | * | 4/1998 | Ganesan | 713/169 |
| 5,943,423 A | * | 8/1999 | Muftic | 705/67 |
| 5,978,475 A | * | 11/1999 | Schneier et al. | 713/177 |
| 5,987,124 A | * | 11/1999 | Matyas et al. | 380/37 |
| 5,991,399 A | * | 11/1999 | Graunke et al. | 380/279 |
| 6,088,450 A | * | 7/2000 | Davis et al. | 713/182 |
| 6,161,183 A | * | 12/2000 | Saito et al. | 713/176 |
| 6,185,684 B1 | * | 2/2001 | Pravetz et al. | 713/182 |
| 6,834,112 B1 | * | 12/2004 | Brickell | 380/279 |
| 6,985,583 B1 | * | 1/2006 | Brainard et al. | 380/44 |
| 7,003,667 B1 | * | 2/2006 | Slick et al. | 713/182 |
| 7,076,062 B1 | * | 7/2006 | Spies | 380/44 |
| 7,178,025 B2 | * | 2/2007 | Scheidt et al. | 713/168 |
| 7,418,599 B2 | * | 8/2008 | Peters | 713/193 |
| 7,519,178 B1 | * | 4/2009 | Matyas et al. | 380/44 |
| 2003/0056099 A1 | * | 3/2003 | Asanoma et al. | 713/172 |

(Continued)

FOREIGN PATENT DOCUMENTS

| | | | |
|---|---|---|---|
| CN | 1302406 A | 7/2001 | |
| WO | 2004107635 A2 | 12/2004 | |
| WO | WO 2005064881 A1 * | 7/2005 | H04L 29/06 |

OTHER PUBLICATIONS

Kaliski, B. RFC 2898, "PKCS #5: Password-Based Cryptography Specificaiton", Version 2.0, Sep. 2000.*

(Continued)

*Primary Examiner* — Justin T Darrow
(74) *Attorney, Agent, or Firm* — Steven M. Greenberg, Esq.; CRGO Law

(57) ABSTRACT

Embodiments of the present invention address deficiencies of the art in respect to symmetric key generation and provide a method, system and computer program product for symmetric key generation using an asymmetric private key. In one embodiment, a symmetric key generation data processing system can include a symmetric key generator configured with a programmatic interface including an input parameter for a seed, an input parameter for an asymmetric private key, and an output parameter for a symmetric key. The symmetric key generator can include program code enabled to generate the symmetric key by encrypting the seed with the asymmetric private key.

19 Claims, 2 Drawing Sheets

(56) References Cited

U.S. PATENT DOCUMENTS

| | | |
|---|---|---|
| 2004/0146015 A1 | 7/2004 | Cross et al. |
| 2005/0055567 A1* | 3/2005 | Libin et al. ............... 713/200 |
| 2005/0229006 A1* | 10/2005 | De Moura et al. ........... 713/186 |
| 2006/0041759 A1* | 2/2006 | Kaliski et al. ............. 713/184 |
| 2007/0014398 A1* | 1/2007 | Eldridge et al. .............. 380/44 |

OTHER PUBLICATIONS

Krawczyk, H. RFC 2104, "HMAC: Keyed-Hashing for Message Authentication", Feb. 1997.*

Menezes, et al., Chapter 8: Public Key Encryption ED, Handbook of Applied Cryptography, CRC Press LLC, Oct. 1, 1996, pp. 283-319.

* cited by examiner

GENERATING A SECRET KEY FROM AN ASYMMETRIC PRIVATE KEY

BACKGROUND OF THE INVENTION

1. Field of the Invention

The present invention relates to the security of confidential information, and more particularly to the generation of a secret key for encrypting confidential information.

2. Description of the Related Art

Security of confidential information remains a vital concern for those that store sensitive information or transmit sensitive information across both secure and insecure networks alike. Presently, cryptography is the preferred method of securing confidential information. In cryptography, security can be achieved through encryption. Encryption involves the conversion of a clear-text message into a data stream that appears to be a meaningless and random sequence of bits known as cipher text.

A cryptographic algorithm, also known as cipher, is the mathematical function that processes plain text input to produce a cipher text message. The cryptographic algorithm further can be configured to process cipher text messages to produce clear text. All modern ciphers use keys together with plain text as the input to produce cipher text. A key is a value that works with a cryptographic algorithm to produce specific cipher text. The same or a different key can be supplied to the decryption function to recover plain text from cipher text.

There are a number of techniques used to encrypt and decrypt information with passwords. Generally, encryption and decryption approaches can be classified as symmetric and asymmetric in nature. The most common approach for symmetric encryption involves the one-way hashing of a known password. A passphrase hash is a method of transforming a text string that can be remembered by a human user, into a result that can be used either: as an "authenticator", which can be stored and used at a later time to check whether a user knows the passphrase, and as pseudorandom data for a cipher or secret key. In the latter circumstance, the passphrase hash is referred to as a Password-Based Key Derivation Function (PBKDF). A driving characteristic of symmetric encryption is that symmetric encryption requires that a password be known and remembered. Moreover, the security of symmetrically encrypted data rises and falls with the security of the encryption key.

Keyed hashes—including hash function based message authentication codes—use a secret key in conjunction with a hash algorithm to generate a message authentication code or checksum. A similar technique for generating message authentication codes uses part of the last cipher text block resulting from encrypting the data with a symmetric key algorithm for the same purpose: to generate a checksum of the message that could only be generated by an entity with the secret key. Both of these forms of checksums rely on processing a message with a shared secret key in order to protect against undetected tampering with a message. Both require a shared secret to use and neither generates a secret.

Many public-key based authentication protocols exist, where a first user sends a challenge to a second user. The second user can encrypt the challenge with a private key associated with the second user and the second user can send the encrypted challenge to the first user. The first user can decrypt the response with the public key associated with the second user in order to confirm that the second user possesses a public key for the second user and should be deemed authentic. This general approach is used in secured sockets layer (SSL) technology and in some certificate-based workstation login schemes. The general approach, however, is suitable only for the authentication of a user, and not for the confidentiality of data.

BRIEF SUMMARY OF THE INVENTION

Embodiments of the present invention address deficiencies of the art in respect to symmetric key generation and provide a novel and non-obvious method, system and computer program product for symmetric key generation using an asymmetric private key. In one embodiment, a symmetric key generation data processing system can include a symmetric key generator configured with a programmatic interface including an input parameter for a seed, an input parameter for an asymmetric private key, and an output parameter for a symmetric key. The symmetric key generator can include program code enabled to generate the symmetric key by encrypting the seed with the asymmetric private key.

In one aspect of the embodiment, the seed can include a text warning disposed within the seed. Also, the seed can be of a length which is less than or equal to a block size for the asymmetric private key. In another aspect of the embodiment, the asymmetric private key can be disposed in a cryptographic token. In yet another aspect of the embodiment, the asymmetric private key can be disposed in a smart card. The smart card yet further can be secured by a PIN code known to an authorized user. In either circumstance, the symmetric key generation data processing system further can include a PBKDF function enabled to receive the generated symmetric key as a password equivalent.

Another embodiment can induce a symmetric key generation method. The method can include encrypting a seed with an asymmetric private key to produce a symmetric key for use as a password in restricting access to a resource. In one aspect of the embodiment, encrypting a seed with an asymmetric private key to produce a symmetric key for use as a password in restricting access to a resource can include retrieving an asymmetric key from a smart card or a cryptographic token and encrypting a seed with the asymmetric private key to produce a symmetric key for use as a password in restricting access to a resource.

Optionally, encrypting a seed with an asymmetric private key to produce a symmetric key for use as a password in restricting access to a resource can include inserting a textual warning in the seed to produce a modified seed, and encrypting the modified seed with the asymmetric private key to produce a symmetric key for use as a password in restricting access to a resource. Moreover, encrypting a seed with an asymmetric private key to produce a symmetric key for use as a password in restricting access to a resource can include encrypting an unencrypted seed with the asymmetric private key to produce an encrypted seed, and combining the encrypted seed with the unencrypted seed to produce the symmetric key for use as a password in restricting access to a resource.

In the latter aspect, combining the encrypted seed with the unencrypted seed to produce the symmetric key for use as a password in restricting access to a resource can include combining the encrypted seed with the unencrypted seed, and encrypting the combination with the asymmetric private key to produce the symmetric key for use as a password in restricting access to a resource. For instance, combining the encrypted seed with the unencrypted seed to produce the symmetric can include hashing the encrypted seed, and concatenating the hashed encrypted seed and the unencrypted seed. Also, combining the encrypted seed with the unencrypted seed to produce the symmetric key can include performing a hash message authentication code (HMAC) production operation with the unencrypted seed as a key for the HMAC production operation and with the encrypted seed as text for the HMAC production operation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for producing a symmetric key from an asymmetric private key. In accordance with an embodiment of the present invention, a seed can be encrypted using an asymmetric private key. The private key can be retrieved securely through a cryptographic token or smart card. Optionally, the smart card can be PIN protected. Subsequently, the encrypted seed can be combined with the unencrypted seed and the combination can be encrypted using the private key. Finally, the resulting value can be used as a symmetric key for a password equivalent for accessing a password-protected resource.

Figure 1:
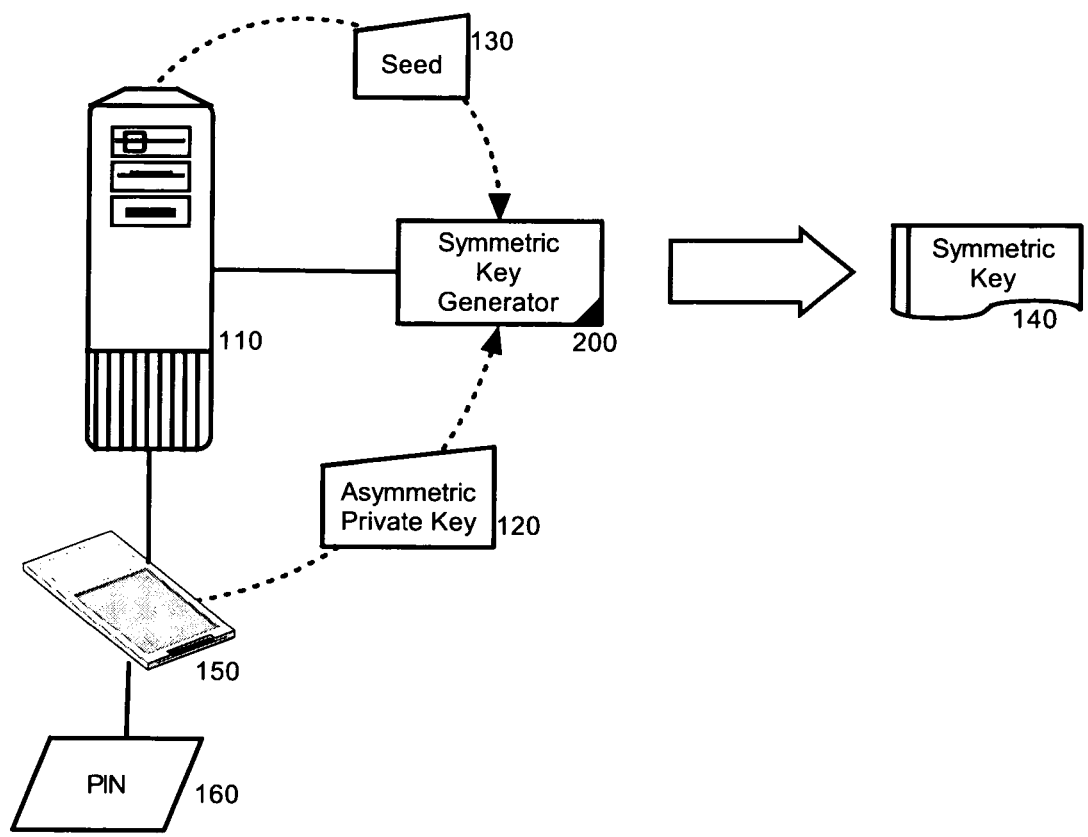
FIG. 1 is a schematic illustration of a data processing system configured to produce a symmetric key from an asymmetric private key; and, FIG. 2 is a flow chart illustrating a method for producing a symmetric key from an asymmetric private key.

In more particular illustration, FIG. 1 is a schematic illustration of a data processing system configured to produce a symmetric key from an asymmetric private key. The data processing system can include a computing platform 110 coupled to a symmetric key generator 200. The symmetric key generator 200 can be configured to process a seed 130 and an asymmetric private key 120 to produce a symmetric key 140. Optionally, the computing platform 110 can be coupled to a smart card reader 150 to read a smart card storing the asymmetric private key 120. The smart card reader 150 optionally can process a PIN code to validate the smart card.

In operation, the symmetric key generator 200 can receive the seed 130, such as a randomly generated value. The symmetric key generator 200 can encrypt the seed 130 using the asymmetric private key 120. Optionally, to add an additional layer of security, the resulting encrypted form of the seed 130 can be combined with the unencrypted seed 130 and the symmetric key generator 200 can encrypt the combination using the asymmetric private key 120. The resulting combination can be used as a symmetric key 140 for securing access to a resource.

Figure 2:
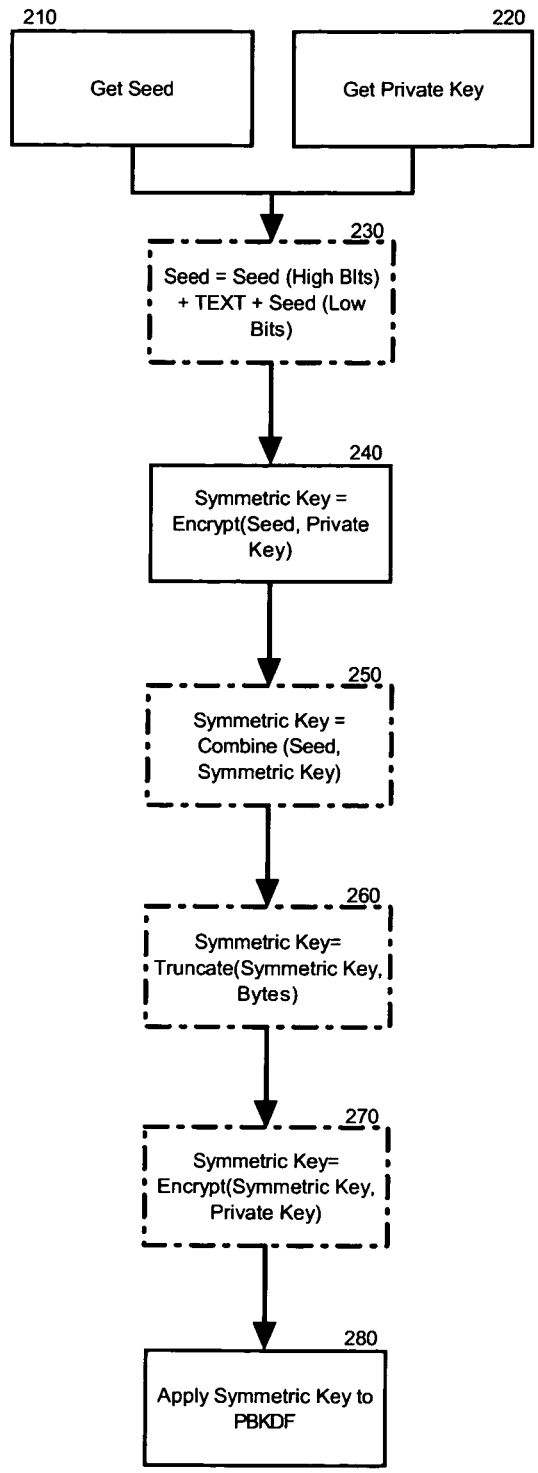

In further illustration of the operation of the symmetric key generator 200, FIG. 2 is a flow chart illustrating a method for producing a symmetric key from an asymmetric private key. Beginning in blocks 210 and 220, both a seed and a private key can be retrieved, respectively. The seed can be a randomly generated seed value. The seed preferably is of a size which is less than or equal to the block size of the asymmetric key. Optionally, the seed can be partitioned in block 230 and a textual warning such as "SECURITY SEED—DO NOT SIGN" can be inserted into the seed. In the optional circumstance, the total length of the modified seed preferably is to remain less than or equal to the block size of the asymmetric key. Importantly, unlike a conventional password or passphrase, the seed need not be memorized or maintained as a secret as the seed can be a randomly generated (and possibly unprintable value).

In block 240, the seed can be encrypted using the asymmetric key. For example, the encryption operation can implement the RSA public key cryptography standard (PKCS) #1 methodology published by RSA Laboratories of Bedford, Mass. USA. In this regard, if the asymmetric key is an RSA compliant key, the resulting encrypted value can be equal in size to the public key modulus for the private key. Specifically, the seed (or modified seed) can be paddded to a length equal in size to the public modulus in accordance with PKCS#1. Subsequently, the padded form of the seed can be encrypted using the RSA compliant private key. In all cases, however, it will be apparent to the skilled artisan that at no time is a hash value produced for the seed prior to encryption.

In block 250, the resulting value from the encryption operation can be combined with the seed (or modified seed) to produce the symmetric key. For example, the resulting value can be hashed and concatenated with the seed (or modified seed). Alternatively, a hashed message authentication code (HMAC) production operation can be performed using the seed (or modified seed) as the key for the HMAC production operation and the resulting value as the text of the HMAC production operation.

Optionally, to add an additional layer of security, the symmetric key produced in block 250 can be discarded as an intermediate value subsequent to its use as input to another encryption operation using the asymmetric private key. Specifically, in block 260, the last byte or bytes of the symmetric key produced in block 250 can be truncated prior to further encrypting the truncated form of the symmetric key in block 270. For example, if an HMAC production operation is utilized in block 250 with an SHA-1 hash function, eighteen of the twenty resulting bytes of the symmetric key can be used in the encryption operation of block 270.

In block 280, the resulting symmetric key can be used as a password in a PBKDF. Again, as an option to add additional layers of security, only a portion of the symmetric key can be used as the password, or a hash of the symmetric key can be used. In consequence of the foregoing methodology, however, the security of the resulting symmetric key is based exclusively on the security of the private key which further can be secured in a smart card. Optionally, the smart card can be further secured through the use of a PIN code for an authorized user. Thus, the end user can be relieved from memorizing a secret key and from maintaining the secrecy of the secret key.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, or semiconductor storage system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A symmetric key generation data processing system comprising:
   a computing platform comprising a processor and memory;
   a symmetric key generator executing in the memory by the processor of the computing platform and configured with a programmatic interface comprising an input parameter for a seed, an input parameter for an asymmetric private key, and an output parameter for a symmetric key;
   said symmetric key generator comprising program code enabled during execution in the memory by the processor to generate said symmetric key by encrypting said seed with said asymmetric private key, combining the encrypted seed with an unencrypted form of the seed, and by encrypting the combination with said asymmetric private key to generate the symmetric key; and,
   a Password-Based Key Derivation Function (PBKDF) enabled to receive said generated symmetric key that had been generated by encrypting said seed with said asymmetric private key as a password.

2. The data processing system of claim 1, wherein said seed comprises a text warning disposed within said seed.

3. The data processing system of claim 1, wherein said seed comprises length which is less than or equal to a block size for said asymmetric private key.

4. The data processing system of claim 1, wherein said asymmetric private key is disposed in a cryptographic token.

5. The data processing system of claim 1, wherein said asymmetric private key is disposed in a smart card.

6. A symmetric key generation method comprising:
   encrypting, by a symmetric key generator executing in memory by a processor of a computing platform, a seed with an asymmetric private key, combining the encrypted seed with an unencrypted form of the seed, and encrypting the combination with said asymmetric private key to produce a symmetric key for use as a password equivalent in restricting access to a resource, the encryption of the seed with the asymmetric private key generating a symmetric key; and,
   utilizing said symmetric key as a password equivalent in restricting access to a resource.

7. The method of claim 6, wherein said encrypting a seed with an asymmetric private key to produce a symmetric key for use as a password equivalent in restricting access to a resource, comprises:
   retrieving an asymmetric key from a smart card; and,
   encrypting a seed with said asymmetric private key to produce a symmetric key for use as a password equivalent in restricting access to a resource.

8. The method of claim 6, wherein said encrypting a seed with an asymmetric private key to produce a symmetric key for use as a password equivalent in restricting access to a resource, comprises:
   retrieving an asymmetric key from a cryptographic token; and,
   encrypting a seed with said asymmetric private key to produce a symmetric key for use as a password equivalent in restricting access to a resource.

9. The method of claim 6, wherein said encrypting a seed with an asymmetric private key to produce a symmetric key for use as a password equivalent in restricting access to a resource, comprises:
   inserting a textual warning in said seed to produce a modified seed; and,
   encrypting said modified seed with said asymmetric private key to produce a symmetric key for use as a password equivalent in restricting access to a resource.

10. The method of claim 6, wherein said combining said encrypted seed with said unencrypted seed to produce said symmetric key for use as a password equivalent in restricting access to a resource, comprises:
    combining said encrypted seed with said unencrypted seed; and,
    encrypting said combination with said asymmetric private key to produce said symmetric key for use as a password equivalent in restricting access to a resource.

11. The method of claim 6, wherein said combining said encrypted seed with said unencrypted seed to produce said symmetric key for use as a password equivalent in restricting access to a resource, comprises:
    hashing said encrypted seed; and,
    concatenating said hashed encrypted seed and said unencrypted seed.

12. The method of claim 6, wherein said combining said encrypted seed with said unencrypted seed to produce said symmetric key for use as a password equivalent in restricting access to a resource, comprises performing a hash message authentication code (HMAC) production operation with said unencrypted seed as a key for said HMAC production operation and with said encrypted seed as text for said HMAC production operation.

13. A computer program product comprising a non-transitory computer usable medium having computer usable program code for symmetric key generation, said computer program product including computer usable program code for encrypting a seed with an asymmetric private key to produce a symmetric key for use as a password equivalent in restricting access to a resource, the encryption of the seed with the asymmetric private key generating a symmetric key;

said computer usable program code for encrypting by said symmetric key generator comprising computer usable program code for encrypting an unencrypted seed with said asymmetric private key to produce an encrypted seed, and computer usable program code for combining said encrypted seed with said unencrypted seed, and encrypting the combination with said asymmetric private key to produce said symmetric key for use as a password equivalent in restricting access to a resource.

14. The computer program product of claim 13, wherein said computer usable program code for encrypting a seed with an asymmetric private key to produce a symmetric key for use as a password equivalent in restricting access to a resource, comprises:
   computer usable program code for retrieving an asymmetric key from a smart card; and,
   computer usable program code for encrypting a seed with said asymmetric private key to produce a symmetric key for use as a password equivalent in restricting access to a resource.

15. The computer program product of claim 13, wherein said computer usable program code for encrypting a seed with an asymmetric private key to produce a symmetric key for use as a password equivalent in restricting access to a resource, comprises:
   computer usable program code for retrieving an asymmetric key from a cryptographic token; and,
   computer usable program code for encrypting a seed with said asymmetric private key to produce a symmetric key for use as a password equivalent in restricting access to a resource.

16. The computer program product of claim 13, wherein said computer usable program code for encrypting a seed with an asymmetric private key to produce a symmetric key for use as a password equivalent in restricting access to a resource, comprises:
   computer usable program code for inserting a textual warning in said seed to produce a modified seed; and,
   computer usable program code for encrypting said modified seed with said asymmetric private key to produce a symmetric key for use as a password equivalent in restricting access to a resource.

17. The computer program product of claim 13, wherein said computer usable program code for combining said encrypted seed with said unencrypted seed to produce said symmetric key for use as a password equivalent in restricting access to a resource, comprises:
   computer usable program code for combining said encrypted seed with said unencrypted seed; and,
   computer usable program code for encrypting said combination with said asymmetric private key to produce said symmetric key for use as a password equivalent in restricting access to a resource.

18. The computer program product of claim 13, wherein said computer usable program code for combining said encrypted seed with said unencrypted seed to produce said symmetric key for use as a password equivalent in restricting access to a resource, comprises:
   computer usable program code for hashing said encrypted seed; and,
   computer usable program code for concatenating said hashed encrypted seed and said unencrypted seed.

19. The computer program product of claim 13, wherein said computer usable program code for combining said encrypted seed with said unencrypted seed to produce said symmetric key for use as a password equivalent in restricting access to a resource, comprises computer usable program code for performing a hash message authentication code (HMAC) production operation with said unencrypted seed as a key for said HMAC production operation and with said encrypted seed as text for said HMAC production operation.

* * * * *